United States Patent [19]
Mills

[11] Patent Number: 5,815,505
[45] Date of Patent: Sep. 29, 1998

[54] COMBINED ANALOG AND DIGITAL COMMUNICATIONS DEVICE

[75] Inventor: Andrew Mills, Austin, Tex.

[73] Assignee: Advanced Micro Devices, Inc., Sunnyvale, Calif.

[21] Appl. No.: 696,201

[22] Filed: Aug. 13, 1996

[51] Int. Cl.$^6$ .................................................. H04Q 11/00
[52] U.S. Cl. .......................... 370/522; 370/264; 370/463; 379/399
[58] Field of Search ..................................... 370/420, 522, 370/524, 465, 463, 264; 375/219, 220; 379/399

[56] References Cited

U.S. PATENT DOCUMENTS

| | | | |
|---|---|---|---|
| 4,991,169 | 2/1991 | Davis et al. | 370/463 |
| 5,305,312 | 4/1994 | Fornek et al. | 370/264 |
| 5,483,530 | 1/1996 | Davis et al. | 370/465 |
| 5,495,485 | 2/1996 | Hughes-Hartogs | 370/524 |
| 5,602,902 | 2/1997 | Satterlund et al. | 375/222 |
| 5,671,251 | 9/1997 | Blackwell et al. | 370/385 |

FOREIGN PATENT DOCUMENTS

0 659 007 A2  6/1995  European Pat. Off. .
0 772 370 A2  5/1997  European Pat. Off. .

*Primary Examiner*—Benedict V. Safourek
*Assistant Examiner*—Kenneth Vanderpuye
*Attorney, Agent, or Firm*—Conley, Rose & Tayon; Jeffrey C. Hood

[57] ABSTRACT

A communications device is presented which is configured to provide selective signal processing at a "plain old telephone service" (POTS) interface, an ISDN U interface, or an ISDN S/T interface. A first POTS connector allows the communications device to be connected to an analog POTS telephone line. A second ISDN U connector allows the communications device to be connected to an ISDN network at an ISDN U interface point. A third ISDN S/T connector allows the communications device to be connected to an ISDN network at an ISDN S/T interface point. A digital signal processing (DSP) core performs: (i) analog modem functions via analog modem emulation when a POTS telephone line is connected to the POTS connector, or (ii) ISDN digital voice and data processing functions along with ISDN S/T and U interface functions when an ISDN line is connected to the ISDN U connector, or (iii) ISDN digital voice and data processing functions along with ISDN S/T interface functions when an ISDN line is connected to the ISDN S/T connector. Interface logic couples signals between the DSP core and the connectors. A digital data path multiplexer coupled between the DSP core and the interface logic includes "autosense" logic which monitors signals received by the connector coupled to the telephone line and determines a data transfer mode based upon the received signals. The digital data path multiplexer provides the data transfer mode information to the DSP core, and the DSP core performs communications operations according to data transfer mode information.

29 Claims, 4 Drawing Sheets

COMBINED ANALOG AND DIGITAL COMMUNICATIONS DEVICE

BACKGROUND OF THE INVENTION

Field of the Invention

This present invention relates generally to telecommunications devices, and more particularly to a combined analog and digital communications device which provides simultaneous signal processing at a standard plain old telephone service (POTS) two-wire telephone interface, an ISDN U interface, an ISDN S/T interface, or asymmetric digital subscriber line (ADSL) interface.

Glossary/Related Terms

23B+D or 30B+D—23 bearer channels and one data/control channel carried within a T1, HDSL or PRI ISDN circuit in the USA for example (30 bearer channels in Europe).
2B +D—two bearer (B) 64 kbps channels and one data/control (D) 16 kbps channel as used in BRI ISDN circuits
2B1Q—two binary, one quarternary, the line encoding technique used in ISDN U interface circuits for example
ADSL—asymmetric digital subscriber line
BRI—basic rate interface, comprising 2B+D channels
CAP—carrierless amplitude phase modulation, a digital transmission scheme also used in some pre-standard ADSL trials and services
CCITT—International Telegraph and Telephone Consultative Committee (now renamed ITU-T)
DMT—discrete multitone, a digital transmission scheme described by the ANSI T1.413-1995 standard
DSL—digital subscriber line
HDSL—high bit rate digital subscriber line. When used to carry T1 circuits, uses two twisted-pair (four-wires) to carry 1.544 Mbps of digital data bit streams (2.048 Mbps over a European E1 line).
ISDN—integrated services digital network
ITU-T—International Telecommunication Union—Telecommunications Standardization Sector
modem—modulator, demodulator, the general term applied to a communications device that utilizes frequency/phase modulation techniques to transport serial digital bit streams
PCM—pulse code modulation
POTS—plain old telephone system
PRI—primary rate interface
PSTN—Public Switched Telephone Network
U interface—two wire ISDN circuit, capable of carrying 160 kbps of user data (2B+D) over 18 kft of twisted pair wiring between a central office and a subscriber premises.
V.34—ITU-T V Series Recommendation for a voice band modem capable of up to 28.8 kbps over POTS interfaces to the PSTN
xDSL—general term for a high speed DSL, where x may be substituted as A or H (as in the ADSL and HDSL cases) or other (presently) pre-standard terms such as S (symmetrical) or RA (rate adaptable asymmetric)

Description of the Relevant Art

Common analog telephone communications devices allow users to exchange both voice messages and digital data via analog signals. Analog signals, such as electrical voltages or currents, may vary continuously over a specified range. The transfer of digital data over ordinary analog telephone lines is commonly carried out using analog modulator-demodulators (modems). A transmitting analog modem converts a digital value (i.e., a logic one or a logic zero) to a corresponding analog signal (e.g., an audible tone). A receiving analog modem performs the opposite function, converting the analog signal to the corresponding digital value. Analog modems are commonly connected to personal computers to enable computers to perform communications functions over ordinary telephone lines. Thus digital communications devices such as computers are often connected through modems to the "plain old telephone system" (POTS), allowing users to communicate with one another over long distances via the existing telephone network.

A more modem type of telephone service referred to as the integrated services digital network (ISDN) uses digital transmission schemes that allows users of a telephone network to exchange both voice signals and digital data in digital form rather than analog, as with POTS. Digital transmission allows information represented in digital form to be transmitted across a medium such as twisted pair wiring in a more reliable fashion using error correction schemes. For example, basic rate ISDN achieves a 160,000 bits per second (160 kbps) user bit rate over 18,000 ft. (18 kft) of twisted pair. In the case of ADSL, rates of up to 6,000,000 bits per second (6 Mbps) over 12 kft and even 51 Mbps over a few thousand feet (i.e., short loops encountered in fiber to the curb applications) can be accomplished.

To achieve these higher data rates, ISDN and xDSL services require special communications devices having ISDN terminal adapters. ISDN terminal adapters are sometimes referred to as ISDN modems since they perform a function analogous to that of analog POTS modems. A transmitting terminal adapter forms digital values into packets or frames of digital information, and transmits the packets of digital information using a digital transmission scheme which ensures that the serial data stream is delivered reliably. A receiving terminal adapter performs the opposite function, extracting digital values from received packets of digital information. The most important functions carried out by the digital transmission scheme include encoding of the data into symbols that may be represented with varying degrees of frequency and phase, line equalization, cancellation of signal echoes, bit error rate monitoring, and so on.

ISDN service provides bearer (ISDN B) channels which transmit voice and data in digital form at 64 kbps, and signaling (ISDN D) channels which transmit digital data at about 16 kbps. The ISDN has two standardized levels of subscriber digital access, a basic rate interface (BRI) and a primary rate interface (PRI). The BRI provides two ISDN B channels and one ISDN D channel (2B+D), and the PRI includes 23 ISDN B channels and one ISDN D channel (23B+D) (30B in Europe). The transmission technology required for ISDN basic rate access is generally referred to as the digital subscriber loop (DSL). Like an analog subscriber loop, a DSL uses a single pair of wires for both directions of transmission between a central office and a subscriber's location. The interface between a communications device and a two-wire ISDN transmission line is referred to as an ISDN "U" interface. In general, the same twisted pair that carries the POTS service is capable of alternatively carrying the ISDN or xDSL service, depending on the overall quality of the cable plant.

Figure 1:
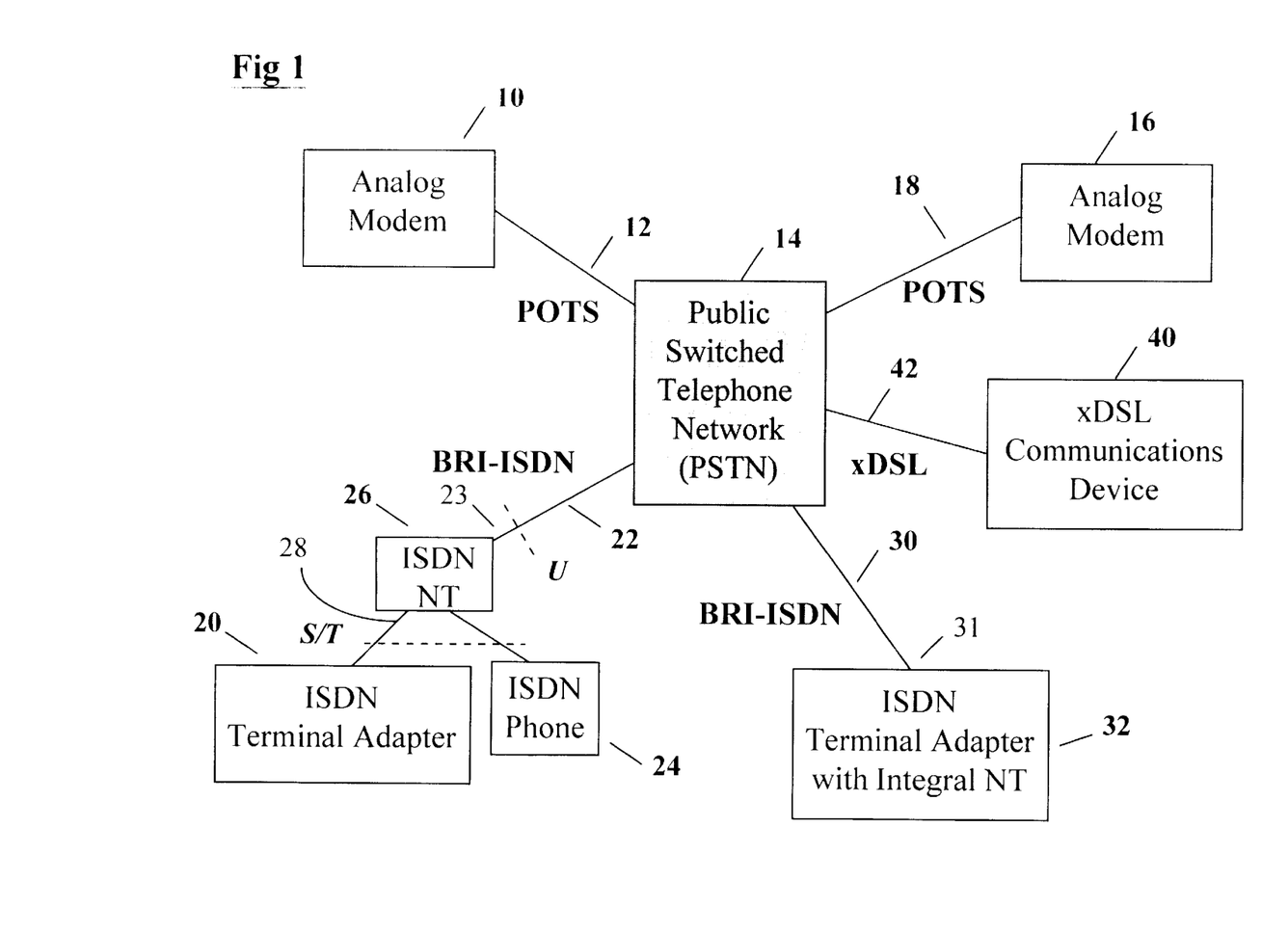
FIG. 1 is a diagram illustrating how communications devices using either modems, ISDN terminal adapters or xDSL devices and having different types of telephone services may communicate via the common public telephone network.

FIG. 1 illustrates how communications devices using either analog modems, ISDN terminal adapters, or xDSL may communicate via the common public telephone network using different types of telephone services. In FIG. 1, a first communications device 10 includes an analog modem connected to a POTS telephone line 12 of a public switched telephone network (PSTN) 14. POTS telephone line 12 is typically a pair of wires twisted together ("two wire twisted pair"). A second communications device 16 also includes an analog modem, and the analog modem 16 is connected to a POTS telephone line 18 of public telephone network 14. The two devices may be connected to the same local telephone exchange, or via local exchanges connected by long distance trunks. Information is transported across the PSTN in digital form and is based on schemes employing multiples of 64 kbps slots that carry, for example, a single voice conversation. First communications device 10 and second communications device 16, both having analog modems and POTS service, may communicate via public telephone network 14 at a data transmission rate supported by POTS service. Analog modems are currently available for use with POTS service which transfer data at a rate of 28.8 kbps using data modulation techniques described in the ITU-T V series recommendations.

A third communications device 20 includes an ISDN terminal adapter connected to an ISDN transmission line 22 of public telephone network 14. ISDN transmission line 22 is typically a pair of wires twisted together similar to those of POTS telephone line 12. Third communications device 20 is supported by ISDN service, allowing digital data transmission rates of 64 kbps using a single bearer (B) channel. From an ISDN viewpoint, the POTS service provided over the twisted pair of POTS telephone line 12 is capable of supporting voice service only (even though digital data in the form of an analog modem signal also uses this voice circuit). On the other hand, ISDN services are capable of supporting both voice service (compatible with the existing POTS) and data service. For the voice class of service, in the case of the POTS telephone line 12, the conversion of the voice class signal from analog to digital occurs at the interface to the PSTN, specifically by a line card in the central office. In general, the analog stream is converted by the line card to a $\mu$-law or A-law (country dependent) compressed 64 kbps pulse code modulated (PCM) stream. An ISDN channel directly carries such a PCM digital stream over one of its B channels.

A fourth communications device, ISDN telephone 24, is capable of converting the digital PCM signals back to voice format, i.e., analog form. D channel signaling from switching equipment in the central office identifies a call from a POTS device, such as communications device 10, as being a voice-type call. In this case, conversion back to analog form by a line card in the central office is not necessary, and is not performed.

In order to exchange data with POTS communications devices which include analog modems (e.g., first communications device 10), it is desirable for an ISDN terminal adapter to be able to interpret the PCM encoded ITU-T V series modem signals correctly. The ISDN terminal adapter within third communications device 20 thus preferably includes additional circuitry in order to detect and terminate or initiate voice originated calls that carry digital data in, for example, ITU-T V series form. Such circuitry contains the means to decode the analog modem signals either directly from the +-law or A-law encoded PCM 64 kbps stream, or alternatively by converting them to analog form (as the central office does for POTS), and coupling the signals to a conventional analog modem device via a built in short analog loop subscriber line from the ISDN terminal adapter itself. The mechanism by which V series analog modem PCM decoding and encoding may be supported via ISDN is described below.

FIG. 1 also illustrates the mechanics of ISDN-to-ISDN via the PSTN and using the data call setup mechanism in ISDN. This allows higher digital data transmission rates than those possible with analog modems and POTS service. Third communications device 20 includes an ISDN terminal adapter having an industry-standard ISDN S/T (four-wire) interface. The ISDN S/T interface includes two pairs of wires, one pair for sending information and one pair for receiving information. The four wires of the ISDN S/T interface of the ISDN terminal adapter are connected to four corresponding wires of an ISDN S/T interface of an industry standard ISDN network termination (ISDN NT) unit 26 at ISDN S/T interface point 28. ISDN NT unit 26 also has an industry-standard ISDN U (two-wire) interface. The ISDN U interface includes a single pair of terminals for both sending and receiving information to and from the central office. The two terminals of the ISDN U interface of ISDN NT unit 26 are connected to a pair of wires making up ISDN transmission line 22 at ISDN U interface point 23. ISDN transmission line 22 is part of public telephone network 14 and provides ISDN service to ISDN telephone 24. Similarly, a fifth communications device 32 includes an ISDN terminal adapter, this time with an integral ISDN NT unit (i.e., no intermediate S/T interface point). The ISDN NT unit is connected to a pair of wires making up an ISDN transmission line 30 at ISDN U interface point 31, providing fifth communications device 32 with ISDN service.

When changing a POTS line to ISDN, a change in communications equipment is required at both the subscriber end (i.e. an ISDN NT unit is required) and the central office (an ISDN U line interface adapter, or an ISDN line card, is required). Third communications device 20 and fifth communications device 32 may communicate using an ISDN data connection mode, which provides an unencoded, clear 64 kbps channel between the two devices using a single B channel, or a 128 kbps channel using two B channels.

An ISDN NT unit is generally a four-wire-to-two-wire interface which performs a defined basic set of communications functions and provides physical and electrical termination of an ISDN transmission line. It is common for the ISDN NT unit to be integrated with other communications devices in order to reduce cost. An ISDN NT unit is typically incorporated into products such as ISDN terminal adapters for personal computer systems. In some cases, an ISDN NT unit may contain additional circuitry to terminate the U interface to provide both ISDN S/T and short loop POTS subscriber line interface circuit (SLIC), permitting connection to legacy POTS phones inside the customer premises. Semiconductor devices developed to perform as ISDN NT units include the PEB2091 device from Siemens (Santa Clara, Calif.). Such devices carry out functions such as digital-to-analog conversion, analog-to-digital conversion, 2B1Q line encoding, line echo cancellation and interfaces the 2-wire interface to either an ISDN S/T device, such as the Am79C30/32 device from Advanced Micro Devices (Sunnyvale, Calif.), or directly to a communications processor.

FIG. 1 also illustrates a more modern approach than basic rate ISDN. These modern approaches utilize more advanced digital transmission techniques, generally referred to xDSL, where the 'x' indicates a number of different variants of the service. Asymmetric digital subscriber line (ADSL) is one example, which employs a digital transmission scheme referred to as discrete multitone (DMT), and also a scheme referred to as carrierless amplitude phase (CAP) modulation (see glossary fore other examples of xDSL). An xDSL transmission line 42 employs the same twisted pair as used for a POTS or ISDN service. The data rates vary according to the length and quality of the line 42. One example is 6.144

Mbps in the direction of the user, 640 kbps returned to the central office (hence the term asymmetric) over 12 kft of twisted pair cable. Another is 384 kbps, or even the same rates as ISDN (160 kbps), over distances greater than 12 kft. xDSL services may not utilize the PSTN, but rather may use a data only network such as the Internet or a dedicated network for digital video distribution. It is likely however that an xDSL communications device 40 could be capable of establishing a connection with a POTS or ISDN communications device via a bridge to the PSTN. Thus xDSL services must be considered a potential candidate for data communications. xDSL communications device 40 will not contain an ISDN NT unit, but will contain a different type of network termination unit (not shown). xDSL communications device 40 is assumed to include the appropriate network termination unit.

Figure 2:
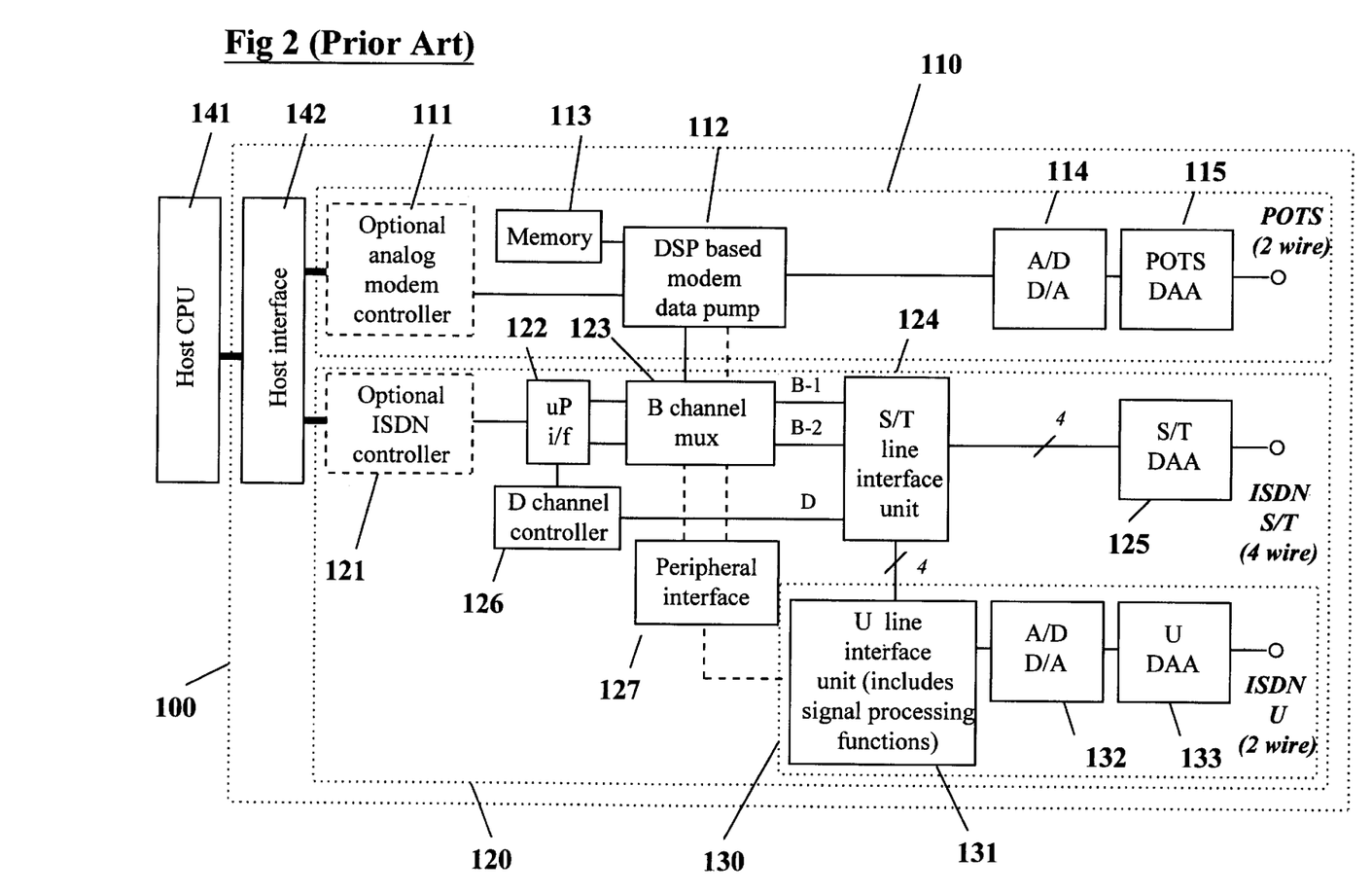
FIG. 2 is a block diagram of a prior art communications device capable of selectively performing analog modem emulation over POTS or ISDN, or ISDN digital voice and data communications.

FIG. 2 is a block diagram of a prior art communications device 100 capable of selectively performing either: (i) ISDN data mode communications with another remote ISDN device at rates of up to 128 kbps over the B channels, or (ii) communications over an ISDN subscriber line with a slower remote ITU-T V series POTS analog modem device at rates governed by the latter device, or (iii) a POTS analog modem function over a POTS line. Communications device 100 may contain a simple ISDN S/T interface to allow it to be connected to the ISDN via an external, standalone ISDN NT unit which converts the ISDN S/T interface to a two-wire U interface, or it may contain the necessary circuitry to interface to the ISDN U line directly.

Communications device 100 interfaces between one of three transmission lines and a host CPU 141. The architecture of communications device 100 includes several dedicated functional units for performing various communications operations. A first section 110 provides the interface to a POTS transmission line. A second section 120 provides either a four-wire ISDN S/T interface or an interface to a two-wire ISDN transmission line at an ISDN U interface point. A third section 130 provides an interface to a two-wire ISDN transmission line at an ISDN U interface point. Third section 130 is essentially an ISDN NT function similar to that in an external ISDN NT unit when the ISDN S/T interface of 100 is used. A host CPU interface 142 is adapted for coupling to a central processing unit or a host device. An optional analog modem controller 111 couples to the host CPU interface 142 and provides modem control functions as well as host computer interface functions. Alternatively, a host CPU 141 may carry out these functions. A DSP-based modem data pump 112 provides modem data pump (i.e., generates modem data). DSP-based modem data pump 112 is coupled to a memory unit 113 containing the appropriate DSP instructions and providing DSP storage. DSP-based modem data pump 112 is coupled to modem controller 111, or alternately to the host CPU interface 142. DSP-based modem data pump 112 is also coupled to a A/D-D/A unit 114 which provides analog-to-digital (A/D) and digital-to-analog (D/A) conversion. A data access arrangement (DAA) 115 is coupled between A/D-D/A unit 114 and a standard POTS two-wire telephone line. DAA 115 provides analog modem signals to the standard POTS two-wire telephone line. A/D-D/A unit 114 and DAA 115 enable communications over the POTS telephone line.

Second section 120 includes off-the-shelf components available today. An optional ISDN controller 121 may perform higher layer processing of the D channel than a dedicated low level D channel controller 126. In addition, ISDN controller 121 may provide additional processing of digital data arriving on either of the ISDN B channels. ISDN controller 121 also provides an interface to the host CPU 141 via host CPU interface 142. If ISDN controller 121 is not present, host CPU 141 may carry out the higher layer functions.

Either host CPU interface 142 or ISDN controller 121 couples to a B channel multiplexing device 123 and to a low level D channel control device 126 via a microprocessor (uP) interface 122. The B channel multiplexer 123 allows the ISDN B channels from the ISDN line, B-1 and B-2, to be connected to various bi-directional processing paths. Example paths are: (i) one or both B channels directly through the uP interface 122 to the ISDN controller 121, or to host CPU 141, for processing of the B channels directly, or (ii) one or both B channels connected to the DSP-based modem data pump 112, or (iii) one B channel to the DSP-based data modem data pump 112 and the other to the optional ISDN controller 121, or to the host CPU 141. Other paths not shown may include a path to a built-in audio processor for ISDN telephone applications. The Am79C30 device form Advanced Micro Devices (Sunnyvale, Calif.) is one such audio processor.

ISDN controller 121 or host CPU 141 is usually responsible for controlling the B channel multiplexer 123. Both B channels are made available to the B channel multiplexer 123 by an ISDN S/T line interface unit (LIU) 124 coupled to an ISDN S/T DAA 125. The B channels may alternatively originate from a direct interface to a built-in ISDN NT unit, bypassing the S/T LIU 124 and the S/T DAA 125.

A peripheral interface unit 127 provides the necessary conversion between the B multiplexer 123 and an ISDN NT interface unit 130. The S/T LIU 124 couples signals from a four-wire ISDN S/T transmission line, connected to S/T DAA 125, to the B multiplexer 123 and D channel controller 126. The S/T LIU 124 contains circuitry for converting the binary signals from the B-1, B-2, and D lines to and from the pseudo-ternary coded signals required on the ISDN S/T transmission line, transmitted and received in differential line driver format. The S/T LIU 124 also provides bit timing recovery, circuitry for detecting logic high and logic low marks, frame recovery and generation, collision detection for multiple external S/T devices, all in accordance with the ITU-T ISDN standards recommendations. The S/T LIU 124 time division multiplexes the individual B channels and the D channels into the ISDN S/T frame structure format that appears on the ISDN line.

The D channel controller 126 processes the 16 kbps link access protocol D channel (LAPD) format stream to and from the S/T LIU 124. The D channel carries either end to end signaling (call setup, tear down information, etc.) or low speed packet data. The ITU-T recommendations describe the use of this channel in more detail. Typically, the D channel controller 126 will perform processing of the level-1 and partial level-2 LAPD protocol (flag detection and generation, zero deletion and insertion, frame check sequence processing for error detection plus some addressing functions. All higher level processing is carried out by either ISDN controller 121 or the host CPU 141.

When device 100 has a built-in ISDN NT function 130, then the S/T interface is not essential, though may still be used to connect to several external S/T terminal devices (not shown) allowing them access to the NT function in order to interface to the ISDN-U two-wire line. The U line interface 131 includes specialized signal processing functions and U line encoding and decoding functions that allow it to interface the S/T signals produced by the S/T LIU 124 to a two-wire ISDN U transmission line. As described above, an ISDN communications device may only connect to a central office and to the PSTN via an ISDN-U interface line, hence it is desirable to integrate this function wherever necessary and where local country telecommunications regulations allow. ISDN U line interface 131 interfaces either between the S/T LIU 124 as shown, or alternatively, via an internal digital bus, to peripheral interface 127, bypassing the S/T conversion stage. ISDN U line interface 131 couples to the ISDN two-wire transmission line via an analog-to-digital and digital-to-analog (A/D-D/A) unit 132 and an ISDN U DAA 133. ISDN U line interface unit 131, A/D-D/A unit 132, and ISDN U DAA 133 provide the function of an ISDN NT unit.

Communications device 100 is configured to selectively provide signal processing at a POTS interface, an ISDN S/T interface or an ISDN U interface. When both a DSP processing function (e.g., analog modem) and an interface to ISDN U are required, for example, unnecessary cost is introduced today through the use of separate signal processing devices for different functions. An improved communications device and method is desired which selectively provides a POTS interface, an ISDN S/T interface, or an ISDN U interface without increasing the number of functional units within the communications device.

SUMMARY OF THE INVENTION

A communications device is presented which is configured to selectively provide signal processing at a POTS interface, an ISDN U interface, or an ISDN S/T interface. A first connector allows the communications device to be connected to an analog POTS telephone line. A second connector allows the communications device to be connected to an ISDN network at an ISDN U interface point. A third connector allows the communications device to be connected to an ISDN network at an ISDN S/T interface point. A digital signal processing (DSP) core performs: (i) analog modem functions when a POTS subscriber line is connected to a first POTS connector, or (ii) ISDN digital voice and data processing functions along with ISDN S/T and U interface functions when an ISDN line is connected to the second connector, or (iii) ISDN digital voice and data processing functions along with ISDN S/T interface functions when an ISDN line is connected to the third connector. Interface logic coupled between the DSP core and the connectors couples signals between the DSP core and the connectors. A memory unit coupled to the DSP core stores software programs and data used by the DSP core. Such programs preferably include instructions which implement the ISDN communications requirements associated with connections to ISDN S/T and U interfaces, and also support different types of data transfer protocols. Example data transfer protocols include simple digital data transfers over data mode ISDN connections via the ISDN U or ISDN S/T connector and also analog modem emulation functions over either ISDN connectors, whereby the DSP simultaneously supports both analog modem functions and ISDN U or S interface functions. In one embodiment, the communications device simultaneously supports other two-wire digital transmission methods (e.g., those used by ADSL) when connections to non-basic rate ISDN two-wire interfaces are made over the subscriber loop.

The preferred embodiment also includes a digital data path multiplexer coupled between the DSP core and the interface logic. The digital data path multiplexer includes "autosense" logic which monitors signals received by the connector coupled to the telephone line and determines a data transfer mode based upon the received signals. The digital data path multiplexer provides information regarding the determined data transfer mode to the DSP core. The DSP core performs communications operations according to data transfer mode information received from the digital data path multiplexer. Where a common analog-to-digital and digital-to-analog interface to the two-wire subscriber line is utilized, such autosense logic may also be present in the A/D-D/A unit in order to detect the type of digital transmission signals being used on the subscriber line.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following references are incorporated herein by reference as though fully and completely set forth herein:

ANSI T1.601-1992, ISDN Basic Access Interface for use on metallic Loops for Applications on the network side of the NT (Layer 1 specification), American National Standards Institute, 11 West 42nd St, New York 10036

ANSI T1.605-1989, Telecommunications—integrated services digital network (ISDN)-basic access for S and T reference points (Layer 1 specification), American National Standards Institute, 11 West 42nd St, New York 10036

PEB2091 Data Sheet—IECQ ISDN Echo Cancellation Circuit, Siemens, Santa Clara, Calif., USA.

ITU-T V.34 Recommendations, ITU-T, Geneva, Switzerland

ANSI T1.413-1995, Network and Customer Interfaces—Asymmetric Digital Subscriber Line (ADSL) Metallic Interface, American National Standards Institute, 11 West 42nd St, New York 10036

CCITT Blue Book, Volume III, Fascicle III.8, Integrated Service Digital Network (ISDN), "Overall Network Aspects and Functions, ISDN User-Network Interfaces", Geneva 1989, ITU-T.

U.S. Pat. No. 4,991,169, Feb. 5, 1991—Real Time Digital Signal Processing Relative to Multiple Digital Communication Channels, Gordon T. Davis, et al.

Am79C30A/32A Digital Subscriber Controller (DSC) Data Sheet, Advanced Micro Devices Pub #09893 Rev G, 1995, AMD Sunnyvale, Calif., USA.

Block Diagram of a Preferred Embodiment

Figure 3:
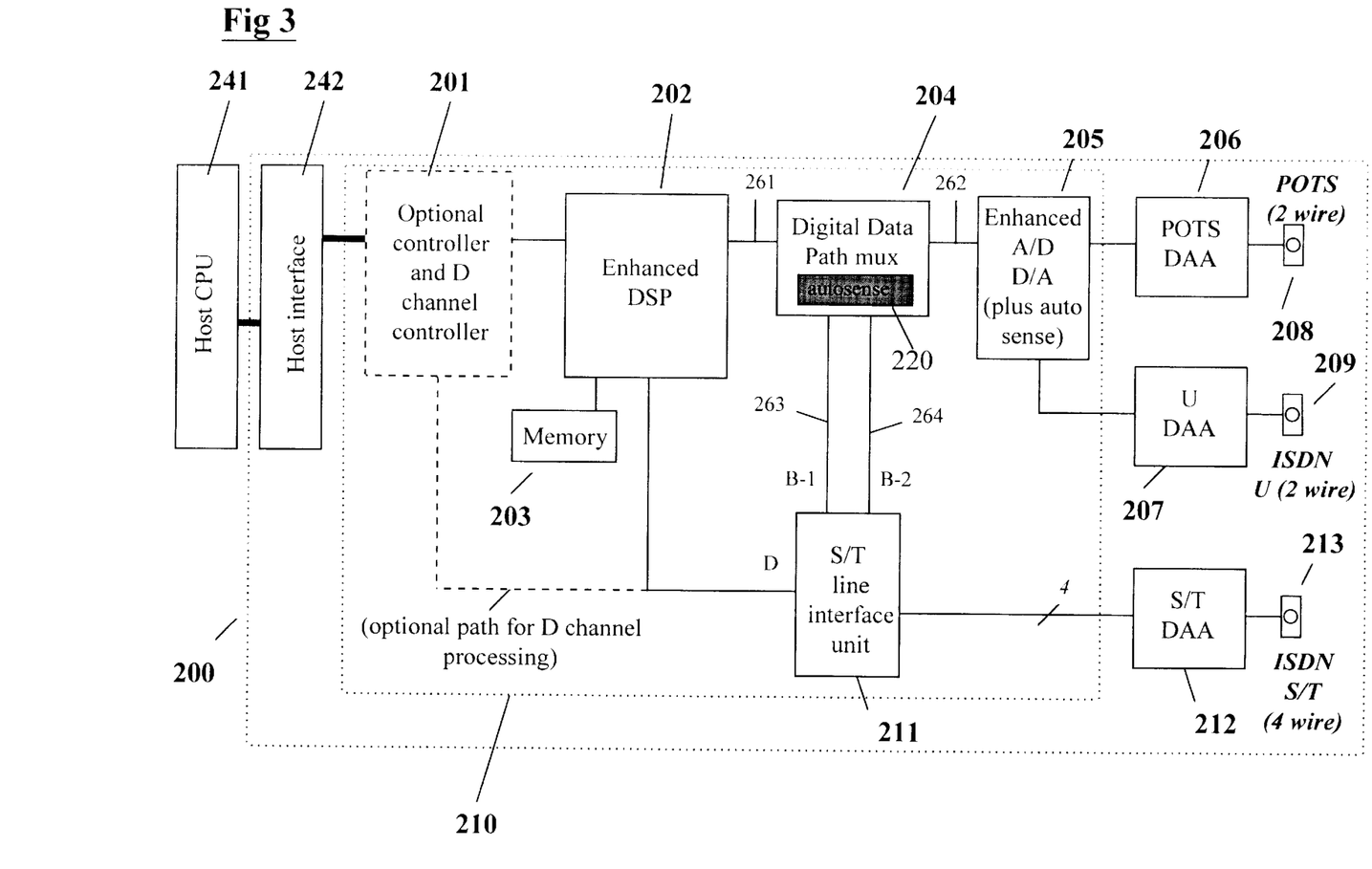
FIG. 3 is a block diagram of a preferred embodiment of a communications device which selectively provides signal processing at a POTS interface, an ISDN S/T interface, or an ISDN U interface.

Referring now to FIG. 3, a block diagram of a communications device 200 according to the preferred embodiment of the present invention is shown. Communications device 200 advantageously selectively provides signal processing at a POTS interface, an ISDN S/T interface, or an ISDN U interface. Communications device 200 includes a host CPU interface 242 which is adapted for coupling to a central processing unit or a host CPU 241. An optional combined modem controller and D channel processing unit 201 couples to the host CPU interface 242 and provides modem control functions and D channel control functions. In one embodiment, the host CPU 241 carries out the functions of combined modem controller and D channel processing unit 201, and thus the combined modem controller and D channel processing unit 201 is not required in this implementation. It is also possible that DSP unit 202 may provide D channel or modem control functions.

The DSP unit 202 is coupled to the optional modem or D channel controller unit 201 and includes a DSP core. The DSP core is capable of simultaneously performing modem data pump, ISDN B channel processing, and ISDN U interface signal processing functions. A memory unit 203 is coupled to DSP unit 202 and stores software instructions and data used by the DSP core of DSP unit 202. A digital data path multiplexer 204 also couples to the DSP unit 202. In one embodiment the digital data multiplexer 204 includes "autosense" logic 220 to enable selection of appropriate transmission line interface mechanisms which allow support of multiple transmission line configurations. This autosense logic 220 may also reside in other components that couple to a transmission line. In another embodiment, analog-to-digital and digital-to-analog (A/D-D/A) converter 205 includes such autosense logic 220 and couples to the digital data path multiplexer 204. The A/D-D/A converter 205 provides both POTS and ISDN U interfacing functions, converting the POTS line signals to and from digital format.

A POTS data access arrangement (DAA) 206 couples to the A/D-D/A unit 205 and provides standard transmission line interface functions, depending on the requirements for each country or telecommunication service provider. A POTS connector 208 couples to the DAA 206 and is adapted for coupling to a two-wire POTS telephone line. The DSP unit 202, the optional controller 201 or host CPU 241, the A/D-D/A unit 205, the DAA 206, and the POTS connector 208 enable analog modem operation over a standard POTS telephone line.

The A/D-D/A unit 205 also provides the necessary functions for interfacing to an ISDN U two-wire line. An ISDN U DAA 207 provides the appropriate termination functions of an ISDN U interface line and couples to the A/D-D/A unit 205 to enable conversion of the ISDN U line signals to and from digital format. The DSP unit 202, the optional controller 201 (or host CPU 241), the A/D-D/A 205, the ISDN U DAA 207, and an ISDN U connector 209 allow communications device 200 to function as an ISDN U communications device for ISDN digital voice and data communications.

An ISDN S/T LIU 211 also couples to the digital data path multiplexer 204 and provides interface functions for an ISDN S/T transmission line to an external ISDN NT unit, or to an external ISDN S/T device. The S/T LIU 211 may contain less functionality than the S/T LIU 124 of FIG. 2, as the DSP unit 202 may provide some of the S interface functions. An S/T DAA 212 couples to the S/T LIU 211 via a four-wire interface and provides the appropriate termination for an ISDN S/T transmission line. An ISDN S/T connector 213 couples to the S/T DAA 212, and is adapted for coupling to an ISDN S/T (four-wire) transmission line at an ISDN S/T interface point. Such an ISDN S/T interface is typically provided for connecting communications device 200 to a two-wire ISDN DSL through an external ISDN NT unit (not shown). The DSP core 202, the optional controller 201 (or host CPU 241), the S/T LIU 211, the S/T DAA 212, and the ISDN S/T connector 213 thus provide an ISDN S/T communications device for ISDN digital voice and data communications.

DSP Core

The DSP core within DSP unit 202 performs POTS service analog modem emulation functions as well as ISDN or xDSL digital signal processing functions in order to support a wide variety of PSTN connection options available to a user. In the case of ISDN, digital signal processing functions include those involved with the processing of digital voice and data signals as well as functions required to comply with ISDN communications requirements. The DSP core performs operations which conform with a basic set of ISDN communications requirements when the ISDN S/T interface is selected, and an additional set of ISDN communications requirements when the ISDN U interface is selected. The ISDN communications requirements are listed in the ITU-T and standards referenced above. The DSP core is capable of quickly switching from one communications operation to another, effectively performing several different communications operations in parallel.

Figure 4:
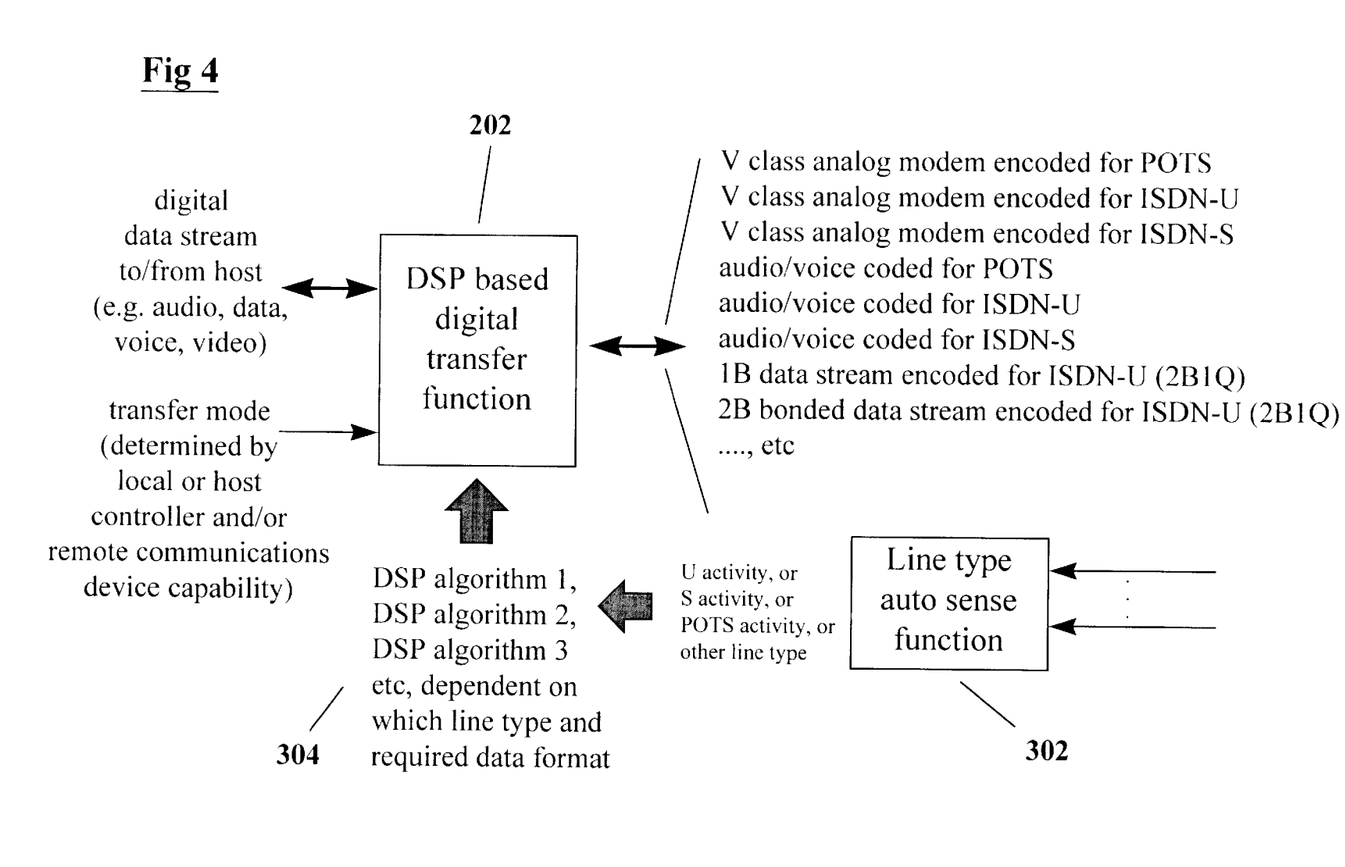
FIG. 4 is a diagram showing how a single DSP core may provide interfacing to a variety of subscriber lines using different communications protocols and analog or digital transmission techniques, depending on the type and nature of the subscriber line.

Referring to both FIGS. 3 and 4, the DSP core receives information from the digital data path multiplexer 204 and an autosense function 302 within digital data path multiplexer 204 regarding the type of transmission line communications device 200 is attached to (e.g., POTS, ISDN U or ISDN S). The digital data path multiplexer 204, under the control of either the optional controller 201 or host CPU 241, couples signals from the active transmission line to the DSP unit 202. Based on the line type and information provided by either the host CPU 241 or optional controller 201 regarding the capability of the remote communications device, the DSP core is loaded with a computer program (i.e., instructions and data) which implements an appropriate communications algorithm 304. Once loaded with the appropriate algorithm, the DSP unit 202 performs a digital transfer function on the data stream between the host CPU 241 (or optional controller 201) and the current active transmission line.

For example, when a POTS telephone line is connected to POTS connector 208, the DSP core performs analog modem emulation and/or voice processing functions according to the ITU V series recommendations. When an ISDN line is connected to ISDN U connector 209, the DSP core performs ISDN digital voice and data processing functions along with ISDN U interface functions. The DSP core performs the ISDN digital voice and data processing functions and ISDN U interface functions substantially simultaneously, i.e., the DSP cores performs these functions as multiple tasks and/or with multiple threads of execution. The DSP unit 202 may also comprise multiple DSP cores for parallel processing, thus also providing substantially simultaneous execution of these functions. When an ISDN line is connected to ISDN S/T connector 213, the DSP core performs ISDN digital voice and data processing functions along with ISDN S/T interface functions. As noted above, the DSP core performs these functions simultaneously.

The DSP core replaces several separate functional units (i.e., silicon cores) in known architectures. The memory unit 203 stores one or more computer programs (i.e., software) and data needed by the DSP core. The one or more computer programs preferably include instructions which implement the ISDN communications requirements associated with connections to ISDN S/T and U interfaces and support different data transfer protocols, including those of different countries.

The functionality of the DSP core is not restricted to the operations described above. The DSP core may also perform the interface and signal processing requirements to other digital subscriber line services. One example is ADSL which uses a different digital transmission and line encoding method than basic rate ISDN. For some embodiments, a general purpose DSP core is utilized such as the ADSP 2171 from Analog Devices, Norwood, Mass. Other higher performance DSP cores are likely to be required as more complex digital transmission schemes are supported.

Digital Data Path Multiplexer

As shown in FIG. 3, the digital data path multiplexer 204 is connected to four bi-directional signal lines and functions as a bi-directional switch, alternately coupling a first bi-directional signal line to a second, a third, and a fourth bi-directional signal line. The first bi-directional signal line 261 connects the unit 202 to the digital data path multiplexer 204. The second bi-directional signal line 262 connects the digital data path multiplexer 204 to the A/D-D/A unit 205. The third and fourth bi-directional signal lines 263 and 264 connect the digital data path multiplexer 204 to the S/T LIU 211. The digital data path multiplexer 204 includes "autosense" logic 220 which monitors signals received by the POTS connector 208 and ISDN U connector 209 via the A/D-D/A unit 205, and ISDN S/T connector 213 via the S/T LIU 211. The autosense logic 220 determines a data transfer mode based on the signals received by the connectors, and provides information regarding the determined data transfer mode to the DSP core. The digital data path multiplexer 204 also performs a coupling function in a manner which causes signals to be transmitted to the appropriate in-line interface mechanism (i.e., analog signals to a POTS interface, and digital signals to the ISDN S/T or U interface). The digital data path multiplexer 204 thus allows communications device 200 to support multiple transmission line configurations. Selection of the transmission line configuration may be automatic (e.g., based on detected line activity), or may be performed under the control of host CPU 241 or appropriate LIU.

When the digital data path multiplexer 204 couples the first bi-directional signal line 261 to the second bi-directional signal line 262, the POTS telephone line interface is selected. Any output signals produced by the DSP unit 202 are received by POTS DAA 206 and A/D-D/A unit 205 (i.e., a modem analog front end) and any output signals produced by the modem analog front end are received by the DSP unit 202. For example, the DSP unit 202, the A/D-D/A 205, and the POTS DAA 206 may function together to implement a standard analog modem function as described in the ITU-T V series recommendations.

The ISDN S/T interface is selected when the digital data path multiplexer 204 couples the first bi-directional signal line 261 to the third, fourth or third and fourth bi-directional signal lines 263 and 264. In this case, one of the following occurs:

(a) signals carried by one or both ISDN B channels are directed to the DSP core with in the DSP unit 202 for processing, or (b) signals carried by one or both ISDN B channels represent a raw digital data stream (single B, 64 kbps and both B, 128 kbps) and are passed through the DSP unit 202 to the optional controller 201 (or host CPU 241) for processing, or (c) the two ISDN B channels are concatenated within the DSP unit 202 to support a combined data transmission rate of 128 kbps using a technique referred to in the industry as "inverse multiplexing" or "bonding", or (d) one ISDN B channel is configured to transmit and receive voice band signals (i.e., operates in ISDN voice connection mode instead of a data mode), and the DSP core within the DSP unit 202 performs either singly, or simultaneously, voice band signal processing functions (including functions such as voice compression and decompression, tone generation, audio signal generation and processing, and so on) and analog data modem emulation over that ISDN B channel, or (e) both ISDN B channels operate in voice connection mode, and the DSP core within the DSP unit 202 performs analog modem emulation over one of the ISDN B channels while simultaneously processing voice band signals carried by the other ISDN B channel. In addition, the DSP core within the DSP unit 202 also performs the ISDN S/T communications requirements when the ISDN S/T interface is selected as described above.

When the digital data path multiplexer 204 couples the first bi-directional signal line to the second bi-directional signal line, and the A/D-D-A unit 205 is connected to the ISDN U DAA 207, the ISDN U interface is selected. In this case, all of the above functions (a)–(e) described for ISDN S/T interface selection are supported. In addition, the DSP core within the DSP unit 202 also performs the ISDN U transmission line signal processing requirements when the ISDN U interface is selected as described above.

The communication architecture of the present invention also permits access to an audio sub-system through additional digital data paths (not shown), allowing such functions as hands-free speakerphone via a personal computer's microphone and speakers and the addition of external coders-decoders (codecs) for interfacing to a second POTS transmission line, for example. Furthermore, the DSP core within the DSP unit 202 is also capable of interfacing to a telephone handset and/or a ringing subscriber line interface circuit (SLIC) device to support ringing of an attached analog telephone device.

Conclusion

A communications device is presented which is configured to selectively provide signal processing at a POTS interface, an ISDN U interface, or an ISDN S/T interface. The communications device includes: (i) a POTS connector which allows the communications device to be connected to an analog POTS telephone line, and (ii) an ISDN U connector which allows the communications device to be connected to an ISDN network at an ISDN U interface point, and (iii) an ISDN S/T connector which allows the communications device to be connected to an ISDN network at an ISDN S/T interface point. A digital signal processing (DSP) core performs: (i) analog modem functions via analog modem emulation when a POTS telephone line is connected to the POTS connector, or (ii) ISDN digital voice and data processing (including analog modem emulation) functions along with ISDN S/T and U interface functions when an ISDN line is connected to the ISDN U connector, or (iii)

ISDN digital voice and data processing (including analog modem emulation) functions along with ISDN S/T interface functions when an ISDN line is connected to the ISDN S/T connector. Interface logic couples signals between the DSP core and the connectors. A memory unit coupled to the DSP core stores software programs and data used by the DSP core. The DSP core interfaces either to a local controller or directly to the host CPU for control and higher layer data processing functions.

The preferred embodiment also includes a digital data path multiplexer coupled between the digital signal processing core and the connectors. The digital data path multiplexer includes "autosense" logic which monitors signals received by the connector coupled to the telephone line and determines a data transfer mode based upon the received signals. The digital data path multiplexer provides information regarding the determined data transfer mode to the DSP core. The DSP core performs communications operations according to data transfer mode information received from the digital data path multiplexer.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A communications device, comprising:
   a first connector adapted for coupling to a POTS telephone line;
   a second connector adapted for coupling to an ISDN telephone line and configured to provide an ISDN U interface;
   a third connector adapted for coupling to an ISDN telephone line and configured to provide an ISDN S/T interface; and
   a digital signal processing (DSP) core, wherein the digital signal processing core is configured to perform:
      analog modem functions when the first connector is coupled to a POTS telephone line;
      ISDN signal processing functions and ISDN S/T and U interface functions when the second connector is coupled to an ISDN telephone line;
      ISDN signal processing functions and ISDN S/T interface functions when the third connector is coupled to an ISDN telephone line; and
   a digital data path multiplexer operably coupled between the DSP core and the first, second, and third connectors, wherein the digital data path multiplexer includes autosense logic which monitors signals received from a telephone line connected to one of the first, second, and third connectors, and wherein the autosense logic determines a data transfer mode based upon the received signals, and wherein the autosense logic provides information regarding the determined data transfer mode to the DSP core, and wherein the DSP core receives the information regarding the determined data transfer mode and performs operations according to the determined data transfer mode.

2. The communications device as recited in claim 1, further comprising interface logic, wherein the interface logic is coupled between the digital data path multiplexer and the first, second, and third connectors, and wherein the interface logic receives digital signals produced by the DSP core, produces output signals, and provides the output signals to:
   the first connector when the first connector is coupled to a POTS telephone line;
   the second connector when the second connector is coupled to an ISDN telephone line; and
   the third connector when the third connector is coupled to an ISDN telephone line.

3. The communications device as recited in claim 1, further comprising a memory unit coupled to the DSP core and configured to store programs and data.

4. The communications device as recited in claim 1, wherein the plurality of data transfer modes comprises an analog modem transfer mode, an ISDN U voice data transfer mode, an ISDN U digital data transfer mode, an ISDN S/T voice data transfer mode, and an ISDN S/T digital data transfer mode.

5. The communications device as recited in claim 4, wherein the interface logic comprises:
   analog modem interface circuitry coupled to the first connector and configured to provide a POTS interface;
   ISDN U interface circuitry coupled to the second connector and configured to provide an ISDN U interface; and
   ISDN S/T interface circuitry coupled to the third connector and configured to provide an ISDN S/T interface.

6. The communications device as recited in claim 4, wherein the plurality of data transfer modes further comprises an xDSL transmission line signal processing and encoding/decoding scheme.

7. The communications device as recited in claim 4, wherein the plurality of data transfer modes further comprises an asymmetric digital subscriber line (ADSL) transfer.

8. The communications device as recited in claim 1, wherein the ISDN signal processing functions comprise ISDN voice data processing functions and ISDN digital data processing functions.

9. The communications device as recited in claim 8, wherein the DSP core is further configured to perform the ISDN signal processing functions and ISDN S/T and U interface functions substantially simultaneously when the second connector is coupled to an ISDN telephone line.

10. The communications device as recited in claim 8, wherein the DSP core is further configured to perform the ISDN signal processing functions and ISDN S/T interface functions substantially simultaneously when the third connector is coupled to an ISDN telephone line.

11. The communications device as recited in claim 8, wherein the DSP core is further configurable to perform the following substantially simultaneously when the second connector is coupled to an ISDN telephone line:
   ISDN voice data processing functions upon signals from one or more ISDN B channels, and
   ISDN S/T and U interface functions.

12. The communications device as recited in claim 8, wherein the DSP core is further configurable to perform the following substantially simultaneously when the third connector is coupled to an ISDN telephone line:
   ISDN voice data processing functions upon signals from one or more ISDN B channels, and ISDN S/T interface functions.

13. The communications device as recited in claim 3, wherein the DSP core is further configured to load programs from the memory unit, wherein the programs configure the DSP core to support one or more of the plurality of data transfer modes.

14. The communications device as recited in claim 1, further comprising a host interface unit coupled to the DSP core and configured to perform host interface functions to a host device, wherein the DSP core is further configurable to pass one or more signals associated with one or more ISDN B channels supporting data connections directly to the host interface unit;

wherein the DSP core is further configurable to pass the one or more signals associated with the one or ISDN B channels supporting direct data connections directly through to the host interface unit substantially simultaneously with performing ISDN signal processing functions and ISDN interface functions.

15. The communications device as recited in claim 1, wherein the DSP core is further configurable to bond two or more ISDN B channels to support a higher data transfer rate;

wherein the DSP core performs bonding on two or more ISDN B channels substantially simultaneously with performing the ISDN signal processing functions and ISDN interface functions.

16. The communications device as recited in claim 1, wherein the DSP core is further configurable to perform analog modem emulation operations upon signals from a single ISDN B channel in a voice connected mode;

wherein the DSP core performs the analog modem emulation operations on the single ISDN B channel in the voice connected mode substantially simultaneously with performing the ISDN signal processing functions and ISDN interface functions.

17. The communications device as recited in claim 1, wherein the DSP core is further configurable to perform analog modem emulation operations upon signals from a first ISDN B channel in a voice connected mode, and to substantially simultaneously process voice data from a second a second ISDN B channel;

wherein the DSP core performs the analog modem emulation operations and substantially simultaneously processes the second ISDN B channel voice signal, and wherein the DSP core also substantially simultaneously performs ISDN interface functions.

18. A communications device, comprising:

a first connector adapted for coupling to a POTS telephone line;

a second connector adapted for coupling to an ISDN telephone line and configured to provide an ISDN U interface;

a third connector adapted for coupling to an ISDN telephone line and configured to provide an ISDN S/T interface;

a digital signal processing (DSP) core, wherein the DSP core is configured to perform:

analog modem functions in an analog transfer mode;

ISDN signal processing functions along with ISDN S/T and U interface functions during an ISDN U transfer mode; and         ISDN signal processing functions and ISDN S/T interface functions during an ISDN S/T transfer mode;

a digital data path multiplexer coupled to the DSP core, wherein the digital data path multiplexer includes autosense logic determines a data transfer mode, and wherein the data transfer mode is:

the analog transfer mode when the first connector is coupled to a POTS telephone line;

the ISDN U transfer mode when the second connector is coupled to an ISDN telephone line; and         the ISDN S/T transfer mode functions when the third connector is coupled to an ISDN telephone line;

a memory unit coupled to the DSP core and configured to store programs and data; and     interface logic, wherein the interface logic is coupled between the digital data multiplexer and the first, second, and third connectors, and wherein the interface logic receives digital signals produced by the DSP core, produces output signals, and provides the output signals to:

the first connector when the first connector is coupled to a POTS telephone line;

the second connector when the second connector is coupled to an ISDN telephone line; and         the third connector when the third connector is coupled to an ISDN telephone line.

19. The communications device as recited in claim 18, wherein the interface logic comprises:

analog modem interface circuitry coupled to the first connector and configured to provide a POTS interface;

ISDN U interface circuitry coupled to the second connector and configured to provide an ISDN U interface; and     ISDN S/T interface circuitry coupled to the third connector and configured to provide an ISDN S/T interface.

20. The communications device as recited in claim 18, wherein the DSP core is further configured to perform xDSL signal processing and protocol functions simultaneously with other functions.

21. The communications device as recited in claim 18, wherein the ISDN signal processing functions comprise ISDN voice data processing functions and ISDN digital data processing functions.

22. The communications device as recited in claim 21, wherein the DSP core is further configured to perform the ISDN signal processing functions and the ISDN S/T and U interface functions substantially simultaneously in the ISDN U transfer mode.

23. The communications device as recited in claim 21, wherein the DSP core is further configured to perform the ISDN signal processing functions and the ISDN S/T interface functions substantially simultaneously in the ISDN S/T transfer mode.

24. The communications device as recited in claim 18, wherein the DSP core is further configured to load programs from the memory unit, wherein the programs configure the DSP core to support one or more of the DSP core functions.

25. The communications device as recited in claim 18, further comprising a host interface unit coupled to the DSP core and configured to perform host interface functions to a host device, wherein the DSP core is further configurable to pass one or more signals associated with one or more ISDN B channels supporting data connections directly to the host interface unit;

wherein the DSP core is further configurable to pass the one or more signals associated with the one or ISDN B channels supporting direct data connections directly through to the host interface unit substantially simultaneously with performing the ISDN signal processing functions and the ISDN interface functions.

26. The communications device as recited in claim 18, wherein the DSP core is further configurable to bond two or more ISDN B channels to support a higher data transfer rate;

wherein the DSP core performs bonding on two or more ISDN B channels substantially simultaneously with performing the ISDN signal processing functions and the ISDN interface functions.

27. The communications device as recited in claim 18, wherein the DSP core is further configurable to perform analog modem emulation operations upon signals from a single ISDN B channel in a voice connected mode;

wherein the DSP core performs the analog modem emulation operations on the single ISDN B channel in the voice connected mode substantially simultaneously with performing the ISDN signal processing functions and the ISDN interface functions.

28. The communications device as recited in claim 18, wherein the DSP core is further configurable to perform analog modem emulation operations upon signals from a first ISDN B channel in a voice connected mode, and to substantially simultaneously process voice data from a second a second ISDN B channel;

wherein the DSP core performs the analog modem emulation operations and substantially simultaneously processes the second ISDN B channel voice signal, and wherein the DSP core also substantially simultaneously performs ISDN interface functions.

29. A communications device, comprising:

a first connector adapted for coupling to a POTS telephone line;

a second connector adapted for coupling to an ISDN telephone line and configured to provide an ISDN U interface;

a third connector adapted for coupling to an ISDN telephone line and configured to provide an ISDN S/T interface;

a digital signal processing (DSP) core, wherein the DSP core is configured to perform analog modem functions in an analog transfer mode, and wherein the DSP core is configured to perform ISDN signal processing functions along with ISDN S/T and U interface functions during an ISDN U transfer mode, and wherein the DSP core is configured to perform ISDN signal processing functions and ISDN S/T interface functions during an ISDN S/T transfer mode;

a digital data path multiplexer coupled to the DSP core, wherein the digital data path multiplexer includes autosense logic which monitors signals received from a telephone line connected to one of the first, second, and third connectors, and wherein the autosense logic determines a data transfer mode, and wherein the data transfer mode is:

the analog transfer mode when signals are received from the first connector;

the ISDN U transfer mode when signals are received from the second connector; and the ISDN S/T transfer mode when signals are received from the third connector;

a memory unit coupled to the DSP core and configured to store programs and data; and interface logic, wherein the interface logic is coupled between the digital data multiplexer and the first, second, and third connectors, and wherein the interface logic receives digital signals produced by the DSP core, produces output signals, and provides the output signals to:

the first connector when the first connector is coupled to a POTS telephone line;

the second connector when the second connector is coupled to an ISDN telephone line; and the third connector when the third connector is coupled to an ISDN telephone line.

\* \* \* \* \*